United States Patent
Yui et al.

(10) Patent No.: US 7,361,408 B2
(45) Date of Patent: Apr. 22, 2008

(54) MOLDED RESIN OBJECT, ELECTRONIC INSTRUMENT USING THE SAME, AND METHOD OF PROCESSING A MOLDED RESIN OBJECT

(75) Inventors: Yasushi Yui, Kawasaki (JP); Shingo Yamaguchi, Kawasaki (JP); Hiroshi Takahashi, Kawasaki (JP); Kouhei Cyouraku, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/337,646

(22) Filed: Jan. 24, 2006

(65) Prior Publication Data

US 2007/0082202 A1 Apr. 12, 2007

(30) Foreign Application Priority Data

Oct. 11, 2005 (JP) ............................ 2005-296071

(51) Int. Cl.
*B32B 9/04* (2006.01)
*B32B 27/06* (2006.01)
*C08J 11/00* (2006.01)
*C08J 11/10* (2006.01)
*C08J 11/18* (2006.01)

(52) U.S. Cl. ................... 428/484.1; 428/492; 428/497; 428/532; 264/340; 523/124; 523/128

(58) Field of Classification Search ...................... None
See application file for complete search history.

(56) References Cited

U.S. PATENT DOCUMENTS

| | | | | |
|---|---|---|---|---|
| 3,903,029 A | * | 9/1975 | Young | 523/125 |
| 4,382,873 A | * | 5/1983 | Gatellier et al. | 516/517 |
| 5,250,353 A | * | 10/1993 | Bartholomew et al. | 428/328 |
| 5,378,738 A | * | 1/1995 | Deguchi et al. | 435/262 |
| 5,558,281 A | * | 9/1996 | Bouldin et al. | 241/51 |
| 5,928,741 A | | 7/1999 | Andersen et al. | |
| 6,051,663 A | * | 4/2000 | Yamamoto et al. | 525/437 |
| 6,190,646 B1 | * | 2/2001 | Tellier et al. | 424/70.19 |
| 6,251,968 B1 | * | 6/2001 | Schledjewski et al. | 523/124 |
| 6,313,194 B1 | * | 11/2001 | Yagi et al. | 523/124 |
| 6,323,307 B1 | * | 11/2001 | Bigg et al. | 528/354 |
| 6,350,337 B1 | * | 2/2002 | Nakamura | 156/155 |
| 6,350,531 B1 | * | 2/2002 | Sugimoto | 428/533 |
| 6,669,771 B2 | * | 12/2003 | Tokiwa et al. | 106/162.7 |
| 6,740,731 B2 | * | 5/2004 | Bigg et al. | 528/354 |
| 6,828,074 B2 | * | 12/2004 | Yano et al. | 430/109.1 |
| 2003/0010508 A1 | * | 1/2003 | Greiner et al. | 169/44 |
| 2003/0079846 A1 | * | 5/2003 | Huang | 162/158 |
| 2004/0019172 A1 | * | 1/2004 | Yang et al. | 527/200 |

FOREIGN PATENT DOCUMENTS

| JP | 05-278738 | | 10/1993 |
|---|---|---|---|
| JP | 2003-041047 | * | 2/2003 |
| JP | 2003-165570 | | 6/2003 |

* cited by examiner

*Primary Examiner*—Vivan Chen
(74) *Attorney, Agent, or Firm*—Staas & Halsey LLP

(57) ABSTRACT

A molded resin object including a molded substrate containing a biodegradable resin and an applied coating formed on a surface of the molded substrate is disclosed, wherein the applied coating contains a proliferation accelerating agent for accelerating proliferation of a microbe. A method of disposing of a molded resin object including a molded substrate containing a biodegradable resin, including a step of applying a coating material on a molded resin object which coating material contains a proliferation accelerating agent for accelerating proliferation of a microbe is also disclosed.

10 Claims, 3 Drawing Sheets

MOLDED RESIN OBJECT, ELECTRONIC INSTRUMENT USING THE SAME, AND METHOD OF PROCESSING A MOLDED RESIN OBJECT

BACKGROUND OF THE INVENTION

1. Field of the Invention

The present invention relates to a molded resin object that contains a biodegradable resin and has an applied coating on a surface thereof, an electronic instrument using it, and a method of processing a molded resin object.

2. Description of the Related Art

Under the increasing of resource conservation and environmental conservation, electronic products have been developed in which the disposal of the product, after the end of the service life thereof or when the product that is no longer required, such as by incineration, recycling (reutilization), reuse (reusing), and dumping, is taken into consideration.

Meanwhile, a conventional plastic made from petroleum as a raw material, such as poly(ethylene) and poly(styrene), has excellent properties of lightness in weight, high strength, and long service life. Since such a plastic emits high heat in an incineration process so as to damage the incinerator and generates a hazardous substance such as dioxin, disposal of it in a landfill has been mainly conducted to date. Moreover, since a plastic case has a high volume per weight, much space is required for incineration. Further, since conventional plastic is hardly decomposed in soil, the problems of environmental damage occur such as an exposed plastic product spoils the natural beauty and has an adverse effect on wildlife. Thus, processing of the conventional plastic after the use thereof has seldom been taken into consideration.

Recently, a biodegradable resin with a significantly higher rate of biodegradation in soil or water than conventional plastics has being developed. A biodegradable resin refers to a plastic decomposed by the biodegradation ability of a microbe in soil or water, which is, for example, converted to water and carbon dioxide when it is completely decomposed by a microbe. As a biodegradable resin, for example, there can be provided polylactide synthesized from starch, that is, polylactic acid, and poly($\epsilon$-caprolactone). In regard to a biodegradable resin, the resin materials and application products thereof, for example, a housing for an electronic instrument, commodities such as a plastic bag, a sheet, a flower pot and fibers, parts of an automobile, and a substituting case of a plastic case for foods are actively being developed. The biodegradable resin not only has good biodegradability in soil but also generates global warming gas such as carbon dioxide and heat in quantities less than a petroleum-derived resin at the time of incineration, and therefore is an earth-conscious material.

A case or sheet in which an applied coating is formed on a surface of a molded item of such a biodegradable resin which coating is also composed of a biodegradable resin is proposed in, for example, Japanese Laid-Open Patent Application Nos. 5-278738 and 2003-165570.

However, where the case or sheet disclosed in Japanese Laid-Open Patent Application No. 5-278738 or 2003-165570 is buried in the ground, the problem is that the rate of biodegradation of the case or sheet is slow such that it takes approximately 1 year through 2 years to decompose it due to microbes in the soil.

SUMMARY OF THE INVENTION

The objects of the present invention are to provide a molded resin object with a rate of biodegradation that can be improved, an electronic instrument using it, and a method of processing a molded resin object with a rate of biodegradation that can be improved.

One of the objects of the present invention can be achieved by a molded resin object including a molded substrate containing a biodegradable resin and an applied coating formed on a surface of the molded substrate, wherein the applied coating contains a proliferation accelerating agent for accelerating proliferation of a microbe.

Another object of the present invention can be achieved by an electronic instrument including a housing which is a molded resin object as described above.

Yet another object of the present invention can be achieved by a method of disposing of a molded resin object including a molded substrate containing a biodegradable resin, including a step of applying a coating material on a molded resin object which coating material contains a proliferation accelerating agent for accelerating proliferation of a microbe.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1:
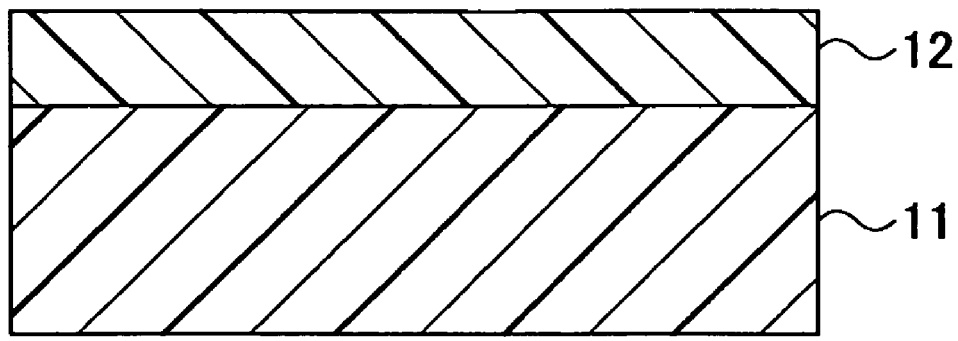
FIG. 1 is a cross-sectional view showing an essential part of a molded resin object according to the first embodiment of the present invention.

According to one aspect of the present invention, there is provided a molded resin object including a molded substrate containing a biodegradable resin and an applied coating formed on a surface of the molded substrate, wherein the applied coating contains a proliferation accelerating agent for accelerating proliferation of microbes.

In this aspect of the present invention, since the proliferation accelerating agent for accelerating proliferation of microbes is contained in the applied coating that covers a surface of the molded substrate containing a biodegradable resin, the proliferation accelerating agent can dissolve in soil or water and become a food (substrate) for microbes living therein, so that the proliferation of the microbes is accelerated. As a result, the number of the microbes can be increased and the rate of biodegradation of the molded substrate containing a biodegradable resin can be increased so that the molded substrate can be biodegraded for a short time.

The applied coating may contain only a coating material containing a natural material in addition to the proliferation accelerating agent. Since the natural material has biodegradability higher than a petroleum-derived resin, the applied coating is biodegraded whereby the molded substrate can easily contact a microbe in soil. As a result, the rate of biodegradation of the molded substrate can be further improved.

In another aspect of the present invention, there is provided an electronic instrument including a housing which is a molded resin object as described above.

In this aspect of the present invention, since the rate of biodegradability of the housing for the electronic instrument is improved where the housing is buried in soil, the housing is biodegraded for a short time in the soil whereby the environmental load can be reduced. Also, since such good biodegradability is exerted under the condition that microbes contact the housing, the problem of biodegradation of the electronic instrument during normal use does not occur.

In yet another aspect of the present invention, there is provided a method of disposing of a molded resin object including a molded substrate containing a biodegradable resin, including a step of applying a coating material on a molded resin object which coating material contains a proliferation accelerating agent for accelerating proliferation of microbes.

In this aspect of the present invention, since a coating material that contains the proliferation accelerating agent for accelerating proliferation of microbes is applied on a surface of the molded substrate containing a biodegradable resin, microbes in soil or water can be proliferated by the proliferation accelerating agent and the rate of biodegradation of the molded substrate containing a biodegradable resin can be increased so that the molded substrate can be biodegraded for a short time.

These aspects of the present invention can provide a molded resin object with a rate of biodegradation that can be improved, an electronic instrument using it, and a method of processing a molded resin object with a rate of biodegradation that can be improved.

Next, the principle of the present invention is described below. A biodegradable resin is decomposed in soil or water (referred to as "in soil" for the simplicity of description, below) by microbes living therein, and converted to an inorganic substance such as oxygen, nitrogen, hydrogen and carbon or gas thereof if the resin is completely decomposed. More specifically, various microbes (such as bacteria and fungi) are living in soil.

The microbe emits an exoenzyme into soil by secretion of the exoenzyme from the microbe or through the cell dissociation of the microbe. An organic substance (for example, a biodegradable resin) is decomposed by the action of the exoenzyme and becomes lower-molecular-weight substances. On the other hand, for example, saccharides such as fructose and glucose or amino acids produced by decomposing the organic substance into lower-molecular-weight substances are food (substrates) for the microbe and the microbe grows and further proliferates by taking the food. As the number of the microbes increases through the proliferation thereof, the secreted or emitted exoenzyme increases and the decomposition of an organic substance, that is, the biodegradation of the organic substance, is activated. However, since the amount of food (substrates) is generally small in soil and there are food-rich soil and food-poor soil which are localized, it is not definite whether a large number of microbes are living in soil to which a molded resin object is disposed.

Therefore, the present invention improves the rate of biodegradation of a molded resin object by containing a proliferation accelerating agent such as carbohydrates and amino acids in an applied coating on a surface of the molded resin object and by proliferating microbes in soil due to the proliferation accelerating agent when the molded resin object is buried in the ground for the disposal thereof.

Next, specific embodiments of the present invention are described referring to the drawings.

First Embodiment

FIG. 1 is a cross-sectional view showing an essential part of a molded resin object according to the first embodiment of the present invention. As referring to FIG. 1, a molded resin object 10 includes a molded substrate 11 and an applied coating 12 covering at least one portion of a surface of the molded substrate 11.

The shape and usage of the molded resin object 10 are not particularly limited and the molded resin object may be, for example, a housing for an electronic apparatus such as a personal computer and a mobile phone, a case, a film, a sheet, a bag, etc.

The molded substrate 11 is made from a mixture of a biodegradable resin and a petroleum-derived resin. Accordingly, the molded substrate can have good biodegradability due to the biodegradable resin and can enhance the mechanical strength of the molded substrate due to the petroleum-derived resin.

As a biodegradable resin, biodegradable polyester resins can be provided. A representative resin of the biodegradable polyester resins is polylactic acid. The polylactic acid is a homopolymer of lactic acid. Besides, as a biodegradable polyester resin, there can be provided polyesters made from hydroxycarboxylic acids such as glycolic acid, glyceric acid, 3-hydroxybutyric acid, tartaric acid and citric acid, polycarboxylic acids such as succinic acid and adipic acid, and lactones, and polyesters which are copolymers made from these monomers.

Also, as other biodegradable polyester resins, there can be provided poly(ethylene succinate), poly(butylene succinate), poly(butylene succinate adipate), poly(butylene succinate adipate terephthalate), poly(butylene succinate terephthalate), poly(butylene succinate carbonate), poly(butylene adipate terephthalate), poly(adipate terephthalate), and poly(tetramethylene adipate terephthalate).

Also, as a biodegradable resin, there can be provided polysaccharide-type polymeric materials such as starch, celluloses, chitosan and pullulan, and polyvinyl alcohol. As a cellulose, for example, cellulose acetate and cellulose triacetate can be provided.

Among the aforementioned biodegradable resins, as a resin with high strength and suitable for a housing or a resinous part of an electronic apparatus, there can be provided polylactic acid, polylactic acid alloys, polylactic acid cellulose, polyvinyl alcohol, and cellulose acetate.

Also, the petroleum-derived resins are synthetic resins made from petroleum and not particularly limited. As a synthetic resin, for example, there can be provided nitrocellulose, phenol resin, alkyd resins, vinyl chloride resin, amino resins such as urea resin and melamine resin, epoxy resins, polyester resins, urethane resins, acryl resins, fluororesins and silicone reins.

Although the mixture ratio (weight ratio) of the biodegradable resin and the petroleum-derived resin in the molded substrate 11 is appropriately determined, it is preferable that the proportion of biodegradable resin be 100% in terms of good biodegradability and a small amount of residue after the biodegradation.

The thickness of the applied coating 12 is, for example, 0.1 μm through 150 μm (preferably, 10 μm through 20 μm) and the applied coating contains a natural material, a petroleum-derived coating material, and a proliferation accelerating agent for accelerating proliferation of microbes. The rate of biodegradation of a natural material by microbes is significantly higher than a petroleum-derived coating material. As the applied coating 12 contains a natural material, the biodegradability of the coating can be enhanced and the amount of residue that has not been biodegraded and remains can be reduced. Also, as the natural material in the applied coating 12 is biodegraded, pores are formed in the applied coating 12, whereby a microbe of nature in soil or water can easily reach the molded substrate 11. Thus, the applied coating 12 does not inhibit the biodegradation of the molded substrate 11 or can suppress the inhibition.

The natural material may be obtained from a plant or from an animal. The natural material from a plant is not particularly limited and, for example, plants themselves, and extracts from plants, for example, juice and pitch can be provided. As such, for example, Japanese lacquer, pine rosin, gum Arabic, and natural rubbers can be provided. Also, as a natural material obtained from an animal, tallow, beeswax, glue, and albumen can be provided.

Also, the petroleum-derived coating material contains a synthetic resin made from petroleum. The rate of biodegradation of such a synthetic resin is significantly lower than the rate of biodegradation of a natural material. As such a synthetic resin, for example, there can be provided nitrocellulose, phenol resin, alkyd resins, vinyl chloride resin, amino resins such as urea resin and melamine resin, epoxy resins, polyester resins, urethane resins, acryl resins, fluororesins and silicone resins. Further, as a synthetic resin, there can be provided photosensitive resins such as radical-polymerizable acrylates that can be polymerized by irradiation of ultraviolet rays and cation-polymerized epoxy resins. Furthermore, as a petroleum-derived coating material, for example, there can be provided a vinyl acetate-containing or acrylic emulsion coating material with a polymer formed through emulsion polymerization as a vehicle.

The proliferation accelerating agent is selected from carbohydrates and amino acids and may contain both of them. The carbohydrates and the amino acids can be utilized by microbes in soil so that the microbes are proliferated. That is, as the molded resin object 10 is buried in soil, the proliferation accelerating agent dissolves in the soil or the applied coating 12 is biodegraded by microbes, whereby the proliferation accelerating agent contacts the microbes. Then, the microbes utilize the proliferation accelerating agent and the proliferation of the microbes is accelerated. Then, since the number of microbes in the soil increases, which can biodegrade the molded resin object 10, the rate of degradation of the molded resin object 10 is improved.

Carbohydrates suitable as the proliferation accelerating agent are monosaccharides and polysaccharides. As a monosaccharide, there can be provided dioses, trioses, tetroses, pentoses, and hexoses.

Also, a polysaccharide is a condensate of a plurality of monosaccharide molecules and, for example, there can be provided disaccharidea such as trehalose, sucrose, maltose, cellobiose, gentiobiose and lactose, trisaccharides such as raffinose and umbelliferose, tetrasaccharides such as stachyose, gangliotetraose and globotetraose, starch, glycogen, and glycerin.

The amino acid is not particularly limited and, for example, α-amino acids can be provided. As an α-amino acid, for example, there can be provided glycine, alanine, valine, and leucine.

The content of the proliferation accelerating agent in the applied coating 12 is 0.1% by weight through 50% by weight. When the content of the proliferation accelerating agent is less than 0.1% by weight, an effect of proliferating microbes is lowered. On the other hand, when the content of the proliferation accelerating agent is greater than 50% by weight, the mechanical strength of the applied coating is lowered.

Further, it is preferable that the applied coating 12 do not contain the petroleum-derived coating material but only contain the proliferation accelerating agent and a coating material containing the natural material. The residue of the applied coating after the biodegradation thereof can be reduced or completely eliminated.

On the other hand, when the applied coating 12 is formed on a surface portion of the molded substrate 11, no coating material containing the natural material may be contained and both the proliferation accelerating agent and the petroleum-derived coating material may be contained. In this case, although the biodegradation of a surface of the molded substrate 11 is suppressed on which surface the petroleum-derived coating material is provided, the biodegradation can be promoted on another surface, which is not problematic.

Additionally, the applied coating 12 may contain a pigment or a curing agent without disturbing the achievement of the object of the present invention.

Next, a method of manufacturing a molded resin object according to the first embodiment is described.

First, a resin composition containing a biodegradable resin is prepared. For the resin composition, each kind of additive such as a plasticizer, an antistatic agent, an antioxidant, a pigment and an ultraviolet absorbing agent, a modifying agent, or filler can be added to the aforementioned biodegradable resin or the petroleum-derived resin without disturbing the achievement of the object of the present invention. A method of manufacturing the resin composition is not particularly limited and, for example, the resin composition may be manufactured using a melt-kneader. As a melt-kneader, for example, there can be provided extruders such as a uniaxial extruder and a biaxial extruder, a Banbury mixer, Brabender, and a kneader. The whole of materials for the resin composition may be melted and kneaded at once. Also, when inorganic powder such as a pigment is added, a portion of the biodegradable resin to be compounded and the inorganic powder may be preliminarily kneaded and then the preliminarily kneaded materials, the residual biodegradable resin, and other materials may be melted and kneaded.

Subsequently, the resin composition is used and molded into the molded substrate 11 with a desired form. The form of the molded substrate 11 is not particularly limited and, for example, the housing, the case, the film and the sheet, as described above, can be provided. For the housing and the case, for example, an injection molding method, a compression molding method, and an extrusion molding method can be used. For the film and the sheet, for example, a vacuum forming method, a compression molding method, and a melt-stretching method can be used.

Also, a coating material is prepared separately from the molded substrate 11. Raw materials of the coating material may include, for example, a synthetic resin made from petroleum, a natural material, a proliferation accelerating agent, a pigment, a curing agent, and an organic solvent. The coating material is formed by kneading and dispersing the synthetic resin, the pigment and a small amount of the organic solvent and adding the organic solvent so that the mixture is formulated to have a desired solid content. Also, when the viscosity of the mixture is low, it is only necessary to simply mix and stir the mixture.

As a synthetic resin, for example, there can be provided nitrocellulose, phenol resin, alkyd resins, vinyl chloride resin, amino resins such as urea resin and melamine resin, epoxy resins, acryl resins, fluororesins and silicone reins. Also, as a natural material, the aforementioned materials can be used.

Among pigments, as a coloring pigment, there can be provided organic pigments such as azo-pigments, quinacridone-type pigments and phthalocyanine-type pigments and inorganic pigments such as titanium oxide, red iron oxide and carbon black. Also, as other pigments, there can be provided extender pigments such as calcium carbonate, silica and talc, which are used as extenders for the coating material. Additionally, the pigment is not an essential raw material for the resin composition.

Next, the coating material is applied on a surface of the molded substrate. The application method is not particularly limited and a publicly known method can be used. For example, a brush coating method, a roll coater method, an air spray method and an airless spray method can be provided. Then, the applied coating is dried at room temperature or by heating. These (application and drying) processes may be repeated. Thus, an applied coating that is more excellent in the mechanical strength thereof can be formed. Also, after the drying, a surface of the applied coating may be smoothed using sandpaper and subsequently a further application may be performed. Thus, the molded resin object 10 including the molded substrate 11 and the applied coating 12 formed thereon is obtained.

According to the first embodiment, since the proliferation accelerating agent is contained in the applied coating 12 on a surface of the molded resin object 10, the proliferation accelerating agent can be food (substrate) for microbes in soil and the proliferation of the microbes is accelerated. As a result, the rate of biodegradation of the molded resin object 10 can be improved.

Figure 2:
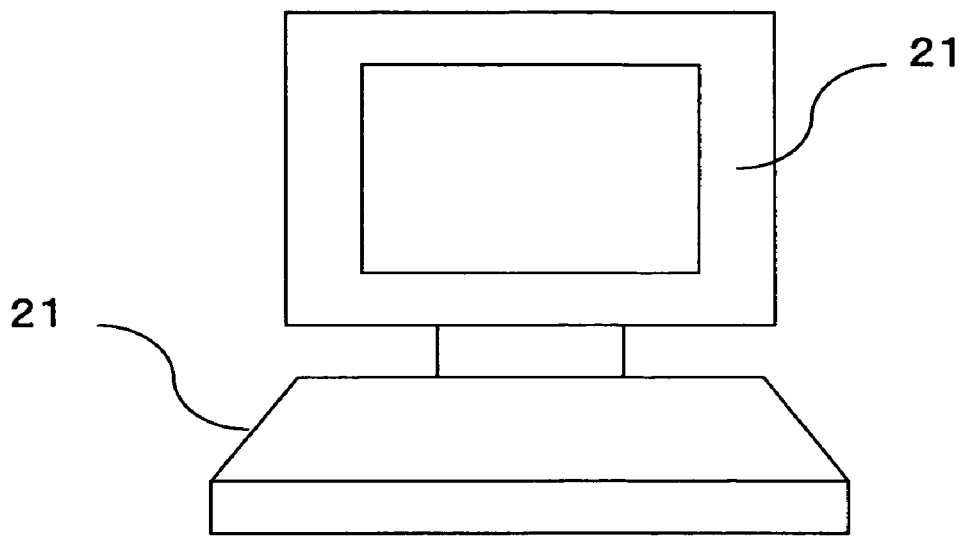
FIG. 2 is a schematic diagram showing an example of an electronic instrument including a housing which is a molded resin object according to the first embodiment.

Further, the molded resin object 10 according to the first embodiment can be employed for a housing of an electronic instrument. FIG. 2 is a schematic diagram showing an example of an electronic instrument including a housing which is a molded resin object according to the first embodiment. The electronic instrument that can be employed is not particularly limited and, for example, there can be provided a personal computer, a display apparatus, a keyboard, a hard disk apparatus, a printer, and a mobile phone. Accordingly, since the rate of biodegradability of the housing 21 of an electronic instrument 20 in FIG. 2 is improved when the housing 21 is buried in soil, the housing 21 is biodegraded in the soil for a short time and the environmental effect can be reduced. Also, since such a good biodegradability is exerted under the condition that microbes contact the housing 21, the problem of biodegradation of the electronic instrument 20 during normal use is not a concern.

Second Embodiment

The second embodiment of the present invention relates to a method of disposing of a molded resin object having a molded substrate containing a biodegradable resin.

Figure 3:
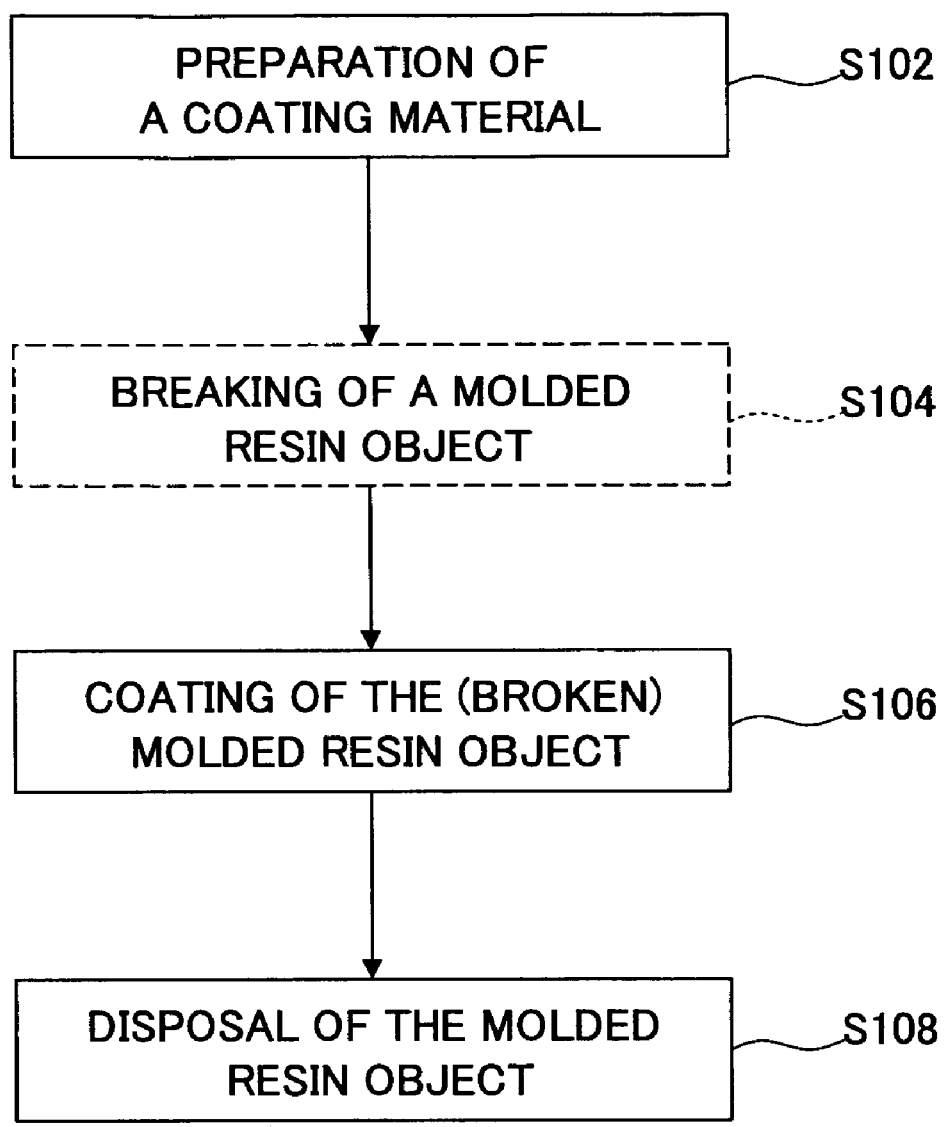
FIG. 3 is a flowchart showing a flow of processing a molded resin object according to the second embodiment of the present invention.

FIG. 3 is a flowchart showing a flow of processing a molded resin object according to the second embodiment of the present invention.

A molded resin object to which the disposition process according to the second embodiment is applied has a molded substrate and an applied coating formed on a surface of the molded substrate. The molded substrate in the second embodiment has a configuration similar to the molded substrate 11 of the molded resin object 10 according to the first embodiment as shown in FIG. 1. That is, the molded substrate 11 contains a biodegradable resin and may contain a petroleum-derived resin. Further, the applied coating is similar to the applied coating 12 of the molded resin object 10 according to the first embodiment as shown in FIG. 1. Alternatively, the applied coating of the molded substrate in the second embodiment does not cover all the surface of the molded substrate and a portion of the molded substrate is exposed. Additionally, in this case, the materials composing the applied coating are not limited and may contain no proliferation accelerating agent.

First, a coating material that is applied on the molded resin object before the disposal thereof is prepared (S102). The raw materials of the coating material are a proliferation accelerating agent, a coating material composed of a natural material, and an organic solvent or water. A petroleum-derived coating material may be further added to these raw materials. These raw materials are mixed and stirred to obtain a coating material. These raw materials of the coating material are selected from materials similar to those described in the first embodiment. Additionally, a pigment or a curing agent may be added according to need. The coating material is preferably an aqueous coating material from the viewpoint of the reduction of environmental effect.

Then, the coating material obtained in S102 is applied on the molded resin object (S106). The application method is not particularly limited and, for example, a brush coating method, a roll coater method, an air spray method and an airless spray method can be provided. Then, the applied coating is dried at room temperature or by heating. Additionally, the drying is not necessarily performed and it is only necessary for the coating material to adhere to a surface of the molded resin object.

Then, the molded resin object with the applied coating formed thereon is buried in soil (S108). Accordingly, the proliferation of microbes in soil is accelerated by the proliferation accelerating agent contained in the applied coating and the rate of biodegradation of the molded resin object is improved. Additionally, the molded resin object may be broken into pieces before the molded resin object is buried. Accordingly, since the surface area of the molded resin object is increased by breaking it into pieces and the contact area of the molded resin object with the microbes is increased, the rate of biodegradation can be further improved.

According to the second embodiment, when the coating material containing a proliferation accelerating agent for accelerating the proliferation of microbes is applied on a surface of the molded substrate containing a biodegradable resin, the proliferation of microbes in soil or water is accelerated by the proliferation accelerating agent and the rate of biodegradation of the molded substrate containing a biodegradable resin is increased, whereby the molded substrate can be biodegraded for a short time.

Also, when a petroleum-derived coating material covers the surface of the molded substrate in the molded resin object, the molded resin object is broken into pieces (S104) before the application of the coating (S106) as shown in FIG. 3. Accordingly, a part of the molded substrate is exposed and an applied coating containing a proliferation accelerating agent is formed on the surface of the molded substrate by means of the application in S106. Thus, even if the molded resin object has the molded substrate covered with the petroleum-derived coating material, the rate of biodegradation of the molded resin object can be improved.

The preferred embodiments of the present invention are described above, but the present invention is not limited to the specifically disclosed embodiments, and variations and modifications may be made without departing from the scope of the present invention.

The present application is based on Japanese Priority Application No. 2005-296071 filed on Oct. 11, 2005, the entire content of which is hereby incorporated by reference.

What is claimed is:

1. A molded resin object comprising:
   a molded substrate comprising a biodegradable resin;
   an applied coating formed on a surface of the molded substrate,
   wherein the applied coating comprises a proliferation accelerating agent for accelerating proliferation of a microbe; and
   a natural material in addition to the proliferation accelerated agent,
   wherein the natural material comprises at least one kind of material selected from the group consisting of juice and pitch obtained from a plant, tallow, beeswax, glue, and albumen.

2. The molded resin object as claimed in claim 1, wherein the molded substrate comprises a petroleum-derived resin.

3. The molded resin object according to claim 1, wherein the:
   coating material further comprises a petroleum-derived coating material.

4. The molded resin object as claimed in claim 3, wherein the natural material has a rate of biodegradation higher than a synthetic resin comprised in the petroleum-derived coating material.

5. The molded resin object according to claim 1, wherein the:
   applied coating is formed on part of the surface of the molded substrate and further comprises a petroleum-derived coating material in addition to the proliferation accelerating agent.

6. The molded resin object as claimed in claim 1, wherein the proliferation accelerating agent is at least one of carbohydrates and amino acids.

7. The molded resin object as claimed in claim 6, wherein the carbohydrate is a monosaccharide or a polysaccharide.

8. An electronic instrument comprising a housing which is a molded resin object as claimed in claim 1.

9. A method of disposing of a molded resin object comprising a molded substrate comprising a biodegradable resin, the method comprising:
   applying a coating material on the molded resin object which coating material comprises a proliferation accelerating agent for accelerating proliferation of a microbe,
   wherein the coating material comprises a natural material in addition to the proliferation accelerating agent, and
   wherein the natural material includes at least one kind of material selected from the group consisting of juice and pitch obtained from a plant, tallow, beeswax, glue and albumen.

10. The method of disposing of a molded resin object as claimed in claim 9, further comprising a step of breaking the molded resin object before the step of applying.

* * * * *

UNITED STATES PATENT AND TRADEMARK OFFICE
CERTIFICATE OF CORRECTION

PATENT NO. : 7,361,408 B2  Page 1 of 1
APPLICATION NO. : 11/337646
DATED : April 22, 2008
INVENTOR(S) : Yasushi Yui et al.

It is certified that error appears in the above-identified patent and that said Letters Patent is hereby corrected as shown below:

Title Page, Column 2 (U.S. Patent Documents), Line 1, change "516/517" to --516/57--.

Title Page, Column 2 (Primary Examiner), Line 1, change "Vivan" to --Vivian--.

Signed and Sealed this

Thirtieth Day of September, 2008

JON W. DUDAS
*Director of the United States Patent and Trademark Office*